(12) United States Patent
Cooper et al.

(10) Patent No.: US 11,809,812 B1
(45) Date of Patent: *Nov. 7, 2023

(54) SYSTEM AND METHOD FOR UPDATING A MASTER SLIDE OF A PRESENTATION

(71) Applicant: GOOGLE LLC, Mountain View, CA (US)

(72) Inventors: Sarah Cooper, New York, NY (US); Michael Owen Thomas, New York, NY (US); Shoshana Holtzblatt, New York, NY (US); Ajay Dev Surie, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,612

(22) Filed: Jan. 10, 2022

Related U.S. Application Data

(63) Continuation of application No. 16/579,649, filed on Sep. 23, 2019, now Pat. No. 11,222,163, which is a
(Continued)

(51) Int. Cl.
*G06F 40/166* (2020.01)
*G06F 3/0484* (2022.01)
(Continued)

(52) U.S. Cl.
CPC .......... *G06F 40/166* (2020.01); *G06F 3/0484* (2013.01); *G06F 16/40* (2019.01);
(Continued)

(58) Field of Classification Search
CPC ...... G06F 40/166; G06F 3/0484; G06F 16/40; G06F 3/0481; G06F 3/0482; G06F 3/04842; G06F 16/4393; G11B 27/34
See application file for complete search history.

(56) References Cited

U.S. PATENT DOCUMENTS 5,416,900 A    5/1995  Blanchard et al.
7,392,475 B1 * 6/2008  Leban ................... G06F 40/169
                                                        715/272
(Continued)

OTHER PUBLICATIONS

Microsoft PowerPoint 2013 ("Microsoft PowerPoint 2013 Fundamentals Workshop," published Oct. 10, 2013 (Year: 2013).
(Continued)

*Primary Examiner* — Tuyetlien T Tran
(74) *Attorney, Agent, or Firm* — Lowenstein Sandler LLP

(57) ABSTRACT

A method for updating a theme element of a presentation includes causing display of a user interface on a client computer of a user, the user interface comprising a first slide of the presentation and a first option to edit an element of the first slide, and receiving a user selection of the first option to edit the element of the first slide, wherein the user selection of the first option comprises a request to modify the element of the first slide. The method further includes causing the element of the first slide to be modified based on the user selection of the first option, receiving a user selection of a second option in the user interface to apply the modification to the element of the first slide to a theme of the presentation, causing the theme element corresponding to the element of the first slide to be updated based on the modification of the element of the first slide, and causing the modification of the element of the first slide to be propagated to elements of other slides of the presentation that are associated with the theme.

21 Claims, 6 Drawing Sheets

Related U.S. Application Data continuation of application No. 14/514,551, filed on Oct. 15, 2014, now Pat. No. 10,423,713.

(60) Provisional application No. 61/891,148, filed on Oct. 15, 2013.

(51) Int. Cl.
| | |
|---|---|
| *G06F 16/40* | (2019.01) |
| *G11B 27/34* | (2006.01) |
| *G06F 3/04842* | (2022.01) |
| *G06F 16/438* | (2019.01) |
| *G06F 3/0482* | (2013.01) |
| *G06F 3/0481* | (2022.01) |

(52) U.S. Cl.
CPC .......... *G06F 3/0481* (2013.01); *G06F 3/0482* (2013.01); *G06F 3/04842* (2013.01); *G06F 16/4393* (2019.01); *G11B 27/34* (2013.01)

(56) References Cited

U.S. PATENT DOCUMENTS

| | | | |
|---|---|---|---|
| 7,526,726 B1* | 4/2009 | Skwarecki | G11B 27/034 715/765 |
| 7,546,544 B1 | 6/2009 | Weber et al. | |
| 8,281,245 B1* | 10/2012 | Bennett | G06F 16/4393 706/46 |
| 8,434,002 B1 | 4/2013 | Shah et al. | |
| 8,495,492 B2 | 7/2013 | Muhlhauser et al. | |
| 8,516,007 B1 | 8/2013 | Bargas et al. | |
| 2004/0107010 A1 | 6/2004 | King | |
| 2004/0205601 A1 | 10/2004 | Smith | |
| 2005/0044499 A1* | 2/2005 | Allen | G11B 27/034 715/704 |
| 2005/0091506 A1* | 4/2005 | Miller | G06Q 20/40 713/182 |
| 2006/0053369 A1 | 3/2006 | Kalajian et al. | |
| 2006/0136819 A1* | 6/2006 | Tolle | G06F 40/186 715/248 |
| 2006/0136827 A1 | 6/2006 | Villaron et al. | |
| 2006/0234765 A1 | 10/2006 | Herberger et al. | |
| 2006/0259858 A1* | 11/2006 | Collins | G06F 40/103 715/243 |
| 2006/0259875 A1* | 11/2006 | Collins | G06F 40/106 715/853 |
| 2006/0265659 A1* | 11/2006 | Collins | G06F 40/103 715/732 |
| 2006/0282759 A1* | 12/2006 | Collins | G06F 40/186 715/764 |
| 2006/0282779 A1* | 12/2006 | Collins | G06F 16/4393 707/E17.118 |
| 2008/0244401 A1* | 10/2008 | Bala | G06F 9/453 715/708 |
| 2009/0076834 A1 | 3/2009 | Rauber et al. | |
| 2009/0172020 A1 | 7/2009 | Kernke et al. | |
| 2009/0276698 A1 | 11/2009 | Clarke et al. | |
| 2010/0088590 A1* | 4/2010 | Bajohr | G06F 40/166 715/236 |
| 2010/0114991 A1 | 5/2010 | Chaudhary et al. | |
| 2010/0325103 A1 | 12/2010 | Miller et al. | |
| 2011/0022960 A1* | 1/2011 | Glover | G06Q 10/10 715/732 |
| 2011/0040804 A1 | 2/2011 | Peirce et al. | |
| 2011/0107223 A1* | 5/2011 | Tilton | G06Q 10/10 715/848 |
| 2011/0296300 A1 | 12/2011 | Parker | |
| 2012/0151309 A1 | 6/2012 | Bastide et al. | |
| 2012/0192055 A1* | 7/2012 | Antebi | G06F 40/169 715/229 |
| 2012/0198325 A1* | 8/2012 | Kief | G06F 16/93 715/234 |
| 2013/0073998 A1* | 3/2013 | Migos | G06F 40/166 715/776 |
| 2013/0111373 A1 | 5/2013 | Kawanishi et al. | |
| 2013/0132843 A1 | 5/2013 | Marnett | |
| 2013/0145305 A1* | 6/2013 | Maloney | G06T 11/60 715/781 |
| 2013/0198617 A1 | 8/2013 | Maloney et al. | |
| 2013/0238977 A1* | 9/2013 | Abrahami | G06F 16/958 715/234 |
| 2013/0239001 A1 | 9/2013 | Maloney et al. | |
| 2013/0239002 A1* | 9/2013 | Maloney | G06T 11/60 715/732 |
| 2013/0346868 A1 | 12/2013 | Scherpa | |
| 2014/0033026 A1* | 1/2014 | Sheridan | G06F 3/048 715/769 |
| 2014/0100676 A1* | 4/2014 | Scott | G05B 15/02 700/83 |
| 2014/0195899 A1 | 7/2014 | Bastide et al. | |
| 2014/0282013 A1* | 9/2014 | Amijee | G06F 3/0482 715/732 |
| 2014/0304307 A1* | 10/2014 | Peirce | G06F 16/40 707/804 |
| 2014/0337706 A1* | 11/2014 | Hsu | G06F 16/958 715/234 |
| 2015/0199308 A1 | 7/2015 | Cooper et al. | |
| 2017/0139927 A1 | 5/2017 | Bendig et al. | |

OTHER PUBLICATIONS

Steve Johnson, Office 2013 On Demand, Jan. 17, 2013, Jan. 17, 2013, ISBN-10: 0-7897-5049-X.

Merriam-Webster Dictionary, "Definition of Theme", https://lwww.merriam-webster.com/dictionary/theme.

Paul McFedries, Constructing Knockout Presentations in PowerPoint [online], published on Apr. 22, 2005, Retrieved from the Internet <URL: http://www.informit.com/articles/article.aspx?p=381918&seqNum=2>.

Steve Johnson, Microsoft PowerPoint 2010 On Demand: Designing a Look, published on Sep. 9, 2010, Retrieved from the Internet <URL: http://www.informit.com/articles/article.aspx?p=1617536&seqNum=8>.

Microsoft, Create an external reference (link) to a cell range in another workbook [online], Retrieved from the Internet URL:https://support.office.com/en-us/article/Create-an-external-reference-link-to-a-cell-range-in-another-workbook-c98d1803-dd75-4668-ac6a-d7cca2a9b95f>.

Groesser, "How to add a footer in PowerPoint 2007", published on Feb. 7, 2013, [online] https://www.youtube.com/watch?v=96DJEQ29X68 (Year: 2013).

* cited by examiner

SYSTEM AND METHOD FOR UPDATING A MASTER SLIDE OF A PRESENTATION

CROSS REFERENCE TO RELATED APPLICATIONS

This patent application is a continuation application of co-pending U.S. Non-Provisional application Ser. No. 16/579,649, filed Sep. 23, 2019, entitled "System And Method For Updating A Master Slide Of A Presentation," which is a continuation application of U.S. Non-Provisional application Ser. No. 14/514,551, filed Oct. 15, 2014, entitled "System And Method For Updating A Master Slide Of A Presentation," now U.S. Pat. No. 10,423,713, which claims the benefit under 35 U.S.C. § 119(d) of U.S. Provisional Application No. 61/891,148, filed Oct. 15, 2013, entitled "System And Method For Updating A Master Slide Of A Presentation," each of which is incorporated herein by reference.

BACKGROUND

Presentation programs may be used to create an electronic document that is used to present information typically including text, images, videos, and other audio or visual elements. One way to maintain consistency throughout the presentation is by use of one or more master slides as well as master elements, for example, templates, styles, placeholders and/or formatting for use throughout the presentation in one or more dependent slides. When a user edits the master slide of the presentation document, the changes may be propagated throughout related elements in dependent slides. This feature allows the user to make overall changes to an entire presentation document without changing each individual slide. Once the master slide and master elements have been set, the user can create and develop the individual slides. In typical uses, a user will edit the individual slides in a normal presentation editing mode. If the user wishes to make a change to the master, the user must exit the normal presentation editing mode and access the master slide using a master editing mode which only allows editing of the master. Transitioning between the normal editing mode and master editing mode, however, can be cumbersome and interrupt the user's work and creative flow.

SUMMARY

The systems and methods described herein are directed to providing the user with the ability to update a master slide, or master elements of a presentation from a normal editing mode by editing a slide in the presentation.

One aspect described herein discloses a method for updating a master element of a presentation by receiving from a user on a client computer an edit to a portion of a slide in a presentation, determining that the edited portion of the slide has a dependent relationship with a master element of the presentation; and providing an option to the user to update the master element of the presentation based on the edit to the portion of the slide. Generally speaking, the edited slide is edited in a normal editing mode and is not a master slide. The provided option can be, for example, updating a master slide of the presentation, a theme of the presentation, a template, or other master element.

Another aspect described herein discloses a method for updating a master element of a presentation by receiving from a user on a client computer an edit to a portion of a slide in a presentation, that is not a master slide in the presentation, and detecting that the presentation has a defined master element. An option is provided to the user to update the master element of the presentation based on the edit to the portion of the slide. The options can include, for example, updating a master slide of the presentation, a theme of the presentation, a template, or other master element. The slide may be edited in a regular slide editing mode and the edit and/or the slide may have no master or dependent relationship with any master slide or master element in the presentation.

BRIEF DESCRIPTION OF THE DRAWINGS

The methods and systems may be better understood from the following illustrative description with reference to the following drawings in which.

DETAILED DESCRIPTION

Figure 1:
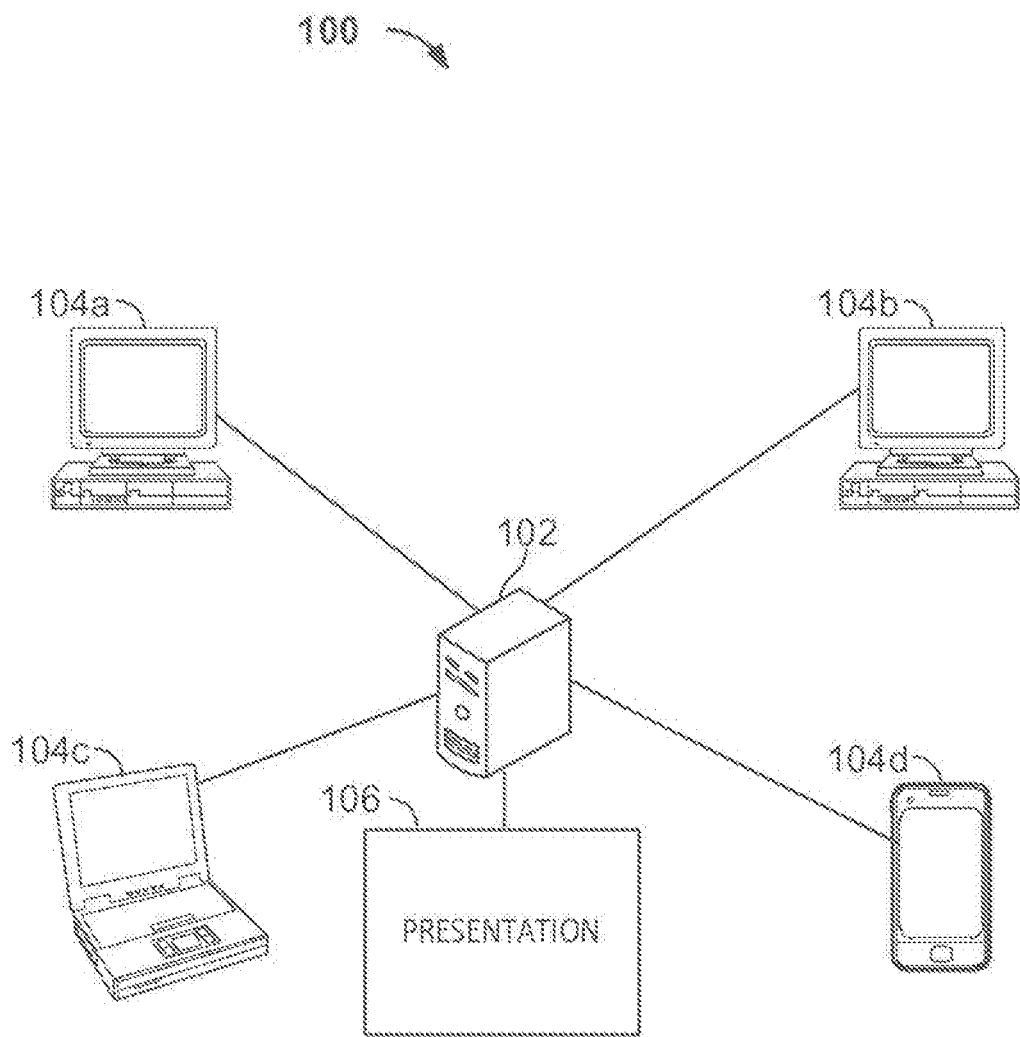
FIG. 1 shows a number of client computers in communication with a cloud computing service storing one or more presentations in accordance with an implementation as described herein.

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices. In addition, the features of the presentation application described herein are discussed in reference to a cloud arrangement, but could also be implemented in a local application on a client computer.

Aspects of the systems and methods described herein relate to updating a master slide or a master element of a presentation using another slide in the presentation, for example, a slide that has a dependent relationship to a master slide or a master element, or simply a slide in a presentation that has certain defined master elements. Presentation programs are commonly used to create documents used to present information and generally include text, images, videos, media or other elements. Although the disclosure is discussed with reference to a presentation document, the techniques described herein may be applied to any document type that includes a master, template, or other fixed document structure.

To produce a presentation that has a consistent layout, a master slide may be used to establish certain formats, fonts, images and other elements that are applied throughout the presentation document. For example, a user may create a title for the presentation document in a master slide that can be used on an initial title slide and that can be set to be included at the top of each, or some set of, subsequent slides. In another example, certain font types and sizes can be used for first list levels, and other fonts and sizes can be used to provide supporting information in lower levels of the list. Some presentation documents also use templates and placeholder objects that can be applied and associated with one or more subsequent dependent slides, for example a company logo in a header or footer, or a background image. Each of these may be considered a master element of a presentation document. Generally speaking, when the user creates a presentation document, the user can add slides or pages to the document and establish dependencies and associations to one or more master slides or master elements.

When a master slide is edited in a master editing mode, the changes made to the master slide are propagated to each of the associated dependent slides. In contrast, when changes are made to an individual slide in the presentations, the edits are typically applied only to the slide being edited. If the user makes an edit to a slide that the user wishes to apply to other slides in the presentation, the user, in conventional systems, would have to make the edit to a master slide or master element. Transitioning between working on a slide that has the desired edit and replicating the desired edit in a master slide can be cumbersome. Accordingly, the systems and methods described herein provide a seamless way to cause updates to a regular slide be updated to a slide master which can then be propagated throughout related elements in the presentation.

First, a client-server system in which a number of client computers may connect to a cloud computing service is described. FIG. 1shows a client-server system 100 that includes cloud computing service 102 and a number of client computers 104a through 104d. Cloud computing service 102 may include one or more servers that collectively provide cloud computing services for a multitude of client computers. Cloud computing service 102 stores a number of files accessible by client computers 104a-104d, including collaborative presentation 106. Users may create, edit, copy, share, and delete files stored on cloud computing service 102. For example, client computers 104a-104d may simultaneously access presentation 106 on cloud computing service 102 using a web browser. Cloud computing service 102 provides each client computer with a local copy of presentation 106, which users on the client computers may view and edit. Edits, sometimes termed mutations, made by client computer 104a are automatically sent to cloud computing service 102 and transmitted to the other client computers 104b-104d. Thus mutations made by one collaborator are immediately seen by other collaborators. Client computers 104a-104d may include desktop computers, laptop computers, tablets, smart phones, mobile electronic devices, or any other device that may connect to cloud computing service 102 through a remote network. System 100 may include many client computers that connect with cloud computing service 102. Cloud computing service 1 02 and client computers 1 04a-104d of system 100 are connected through a remote network, such as the Internet. The network connection may be facilitated through a local area network, wide area network, Ethernet, fiber optic network, or any other wired or wireless connection.

Figure 2:
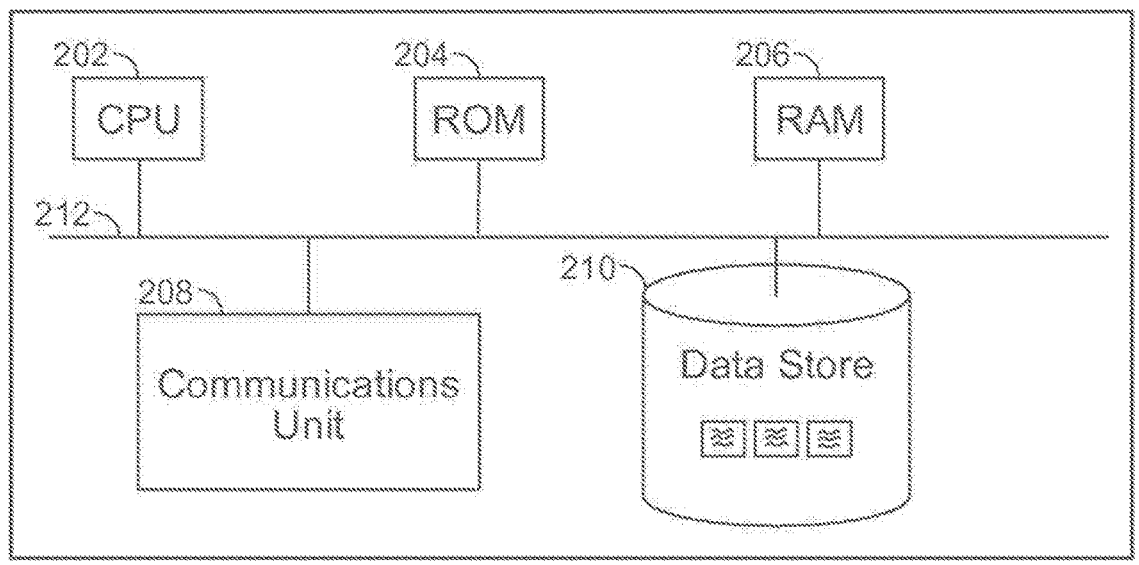
FIG. 2 shows a server implementing a cloud computing service in accordance with an implementation as described herein.

A server for providing a cloud computing service is now described in more detail. Server 200 in FIG. 2 shows an example of a server for use in a cloud computing service. A cloud computing service may include a number of servers that collectively provide the cloud computing service. Server 200 includes a central processing unit (CPU) 202, read only memory (ROM) 204, random access memory (RAM) 206, communications unit 208, data store 210, and bus 212. Server 200 may have additional components that are not illustrated in FIG. 2. Bus 212 allows the various components of server 200 to communicate with each other. Communications unit 208 allows server 200 to communicate with other devices, such as a number of client computers. Data store 210 may store, among other things, files that may be accessed, viewed, or edited by a number of client computers. These files may include word processing files, presentation files, presentations, or multimedia files. Each file in data store 210 may be associated with an access control list (ACL), which determines the access rights of users attempting to view files in data store 210 (e.g. write access, read access, no access). Users connect with server 200 through communications unit 208 to access files stored in data store 210.

A client computer for accessing files stored on a cloud computing service is now described in more detail. Client computer 300 in FIG. 3 includes a central processing unit (CPU) 302, read only memory (ROM) 304, random access memory (RAM) 306, input/output interface 308, web browser 310, and bus 312. Client computer 300 may have additional components that arc not illustrated in FIG. 3. Bus 312 allows the various components of client computer 300 to communicate with each other. Input/output interface 308 allows client computer 300 to communicate with other devices, such as a cloud computing service, and also includes devices for taking in user inputs and displaying outputs to a user. Web browser 310 is used, among other things, to provide a user interface to view and edit files stored on a cloud computing service. Web browser 310 also displays mutations made by other collaborators who may be editing the same file as the user of client computer 300. The cloud computing service may determine the layout of the user interface displayed on web browser 310 for accessing and viewing files.

Figure 3:
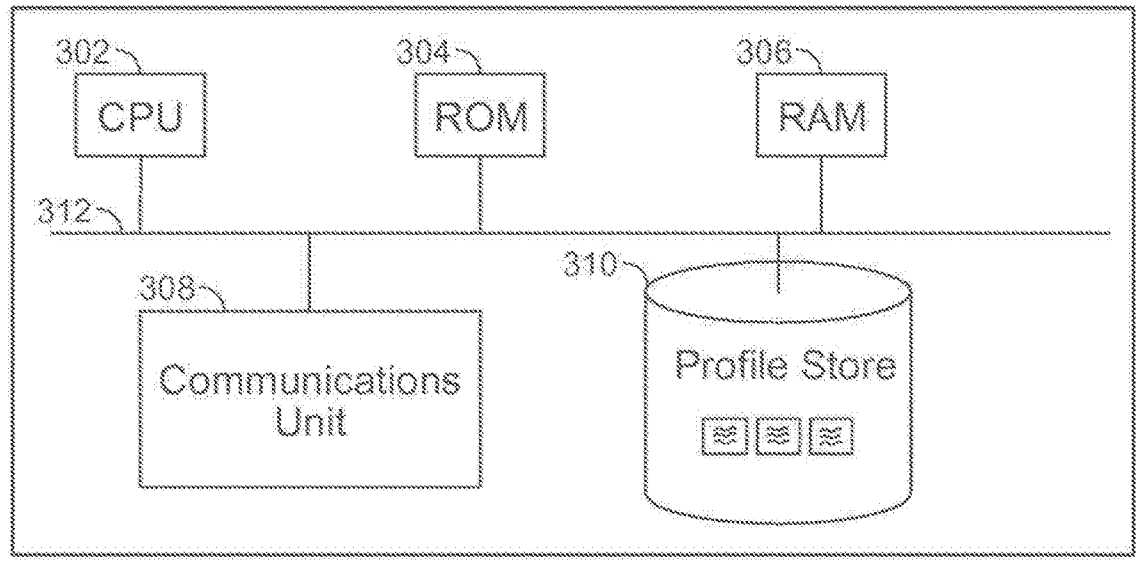
FIG. 3 shows a client computer for loading a presentation stored on a cloud computing service in accordance with an implementation as described herein.

Data store 210 for files stored on cloud computing service 200 in FIG. 2, web browser 310 for client computer 300 in FIG. 3, and other data structures and software programs on cloud computing service 200 and client computer 300 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

Figure 4A:
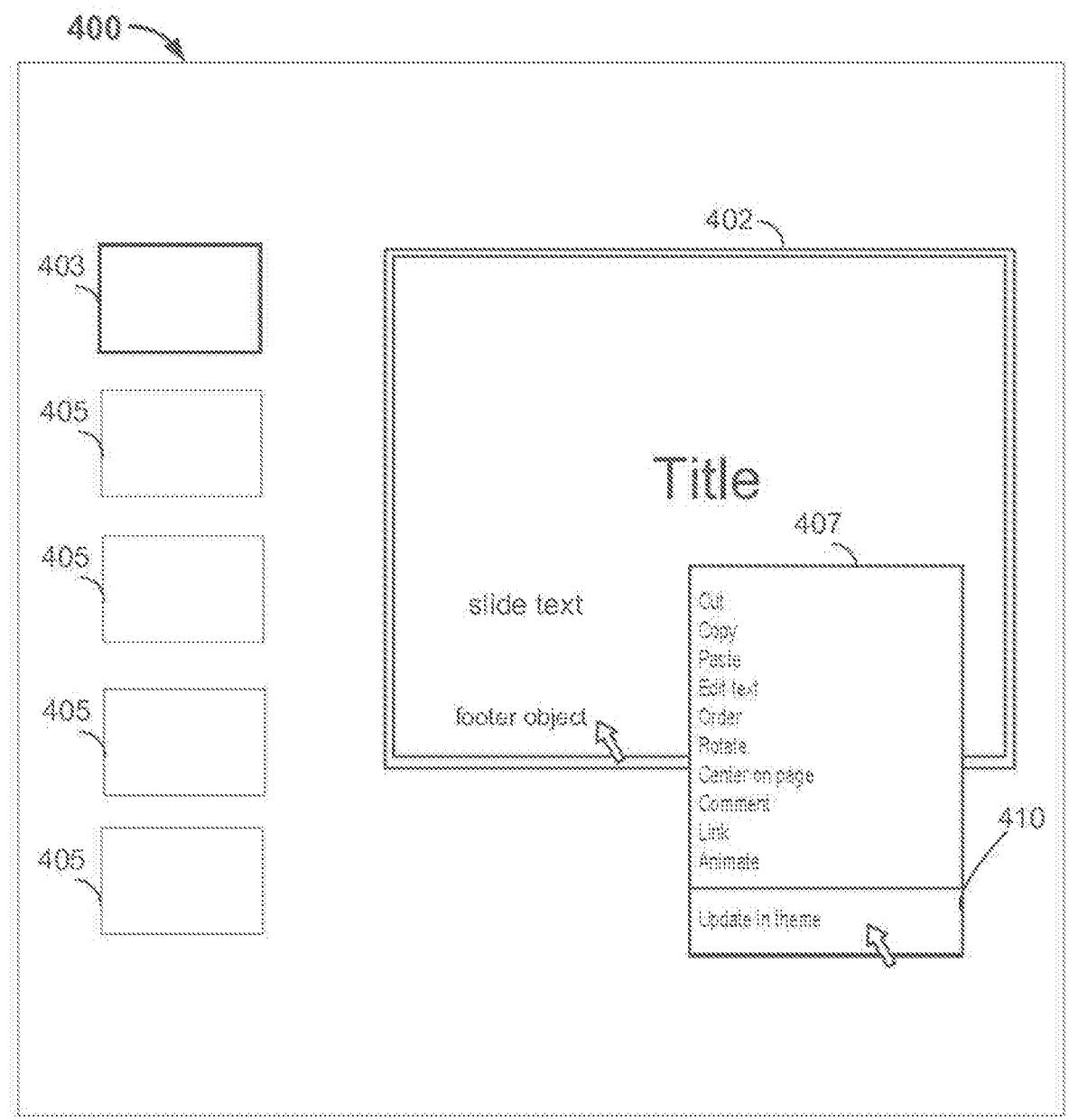
FIGS. 4A-B show examples of displays editing a slide in a presentation in accordance with an implementation as described herein.

FIG. 4A shows an example of a presentation editing display 400 which may be provided using a browser on a client computer 104. As shown, the display 400 includes a slide 402 which includes certain text elements, for example, a title, slide text and a footer object. Although not necessarily shown, any type of slide element can be included in slide 402. The display 400 may also a filmstrip of other slides in the presentation, including the edited slide 403 which corresponds to slide 402, and other slides in the presentation 405. When the user edits slide 402 in a normal editing mode, changes made to slide 402 are applied only to slide 402. When the user edits elements of slide 402, the user can be provide d functions and options using a context menu 407 which can be activated for display by selecting an element in the slide with a pointing device, such as a mouse and right clicking the element, or using a touch screen and activating a menu, or otherwise causing a menu to appear in the display. Any editing functions can be provided in the menu, for example, cut, copy, paste, edit, order, rotate, center, comment, link, animate, or other function. In addition, the user can select "update in theme" 410 which can cause the most recent edit in the slide to be updated to a master element that is associated with the portion of the slide what was edited. For example, a user can select the footer object in slide 402 and replace the image, or move the footer placement, change the font, or make some other edit to the footer object. Then by selecting the context menu to "update in theme" 410, the master footer can be updated based on the edit. Then because the master footer has been updated, any other slides in the presentation that are dependent on the master footer are also updated accordingly.

Figure 4B:
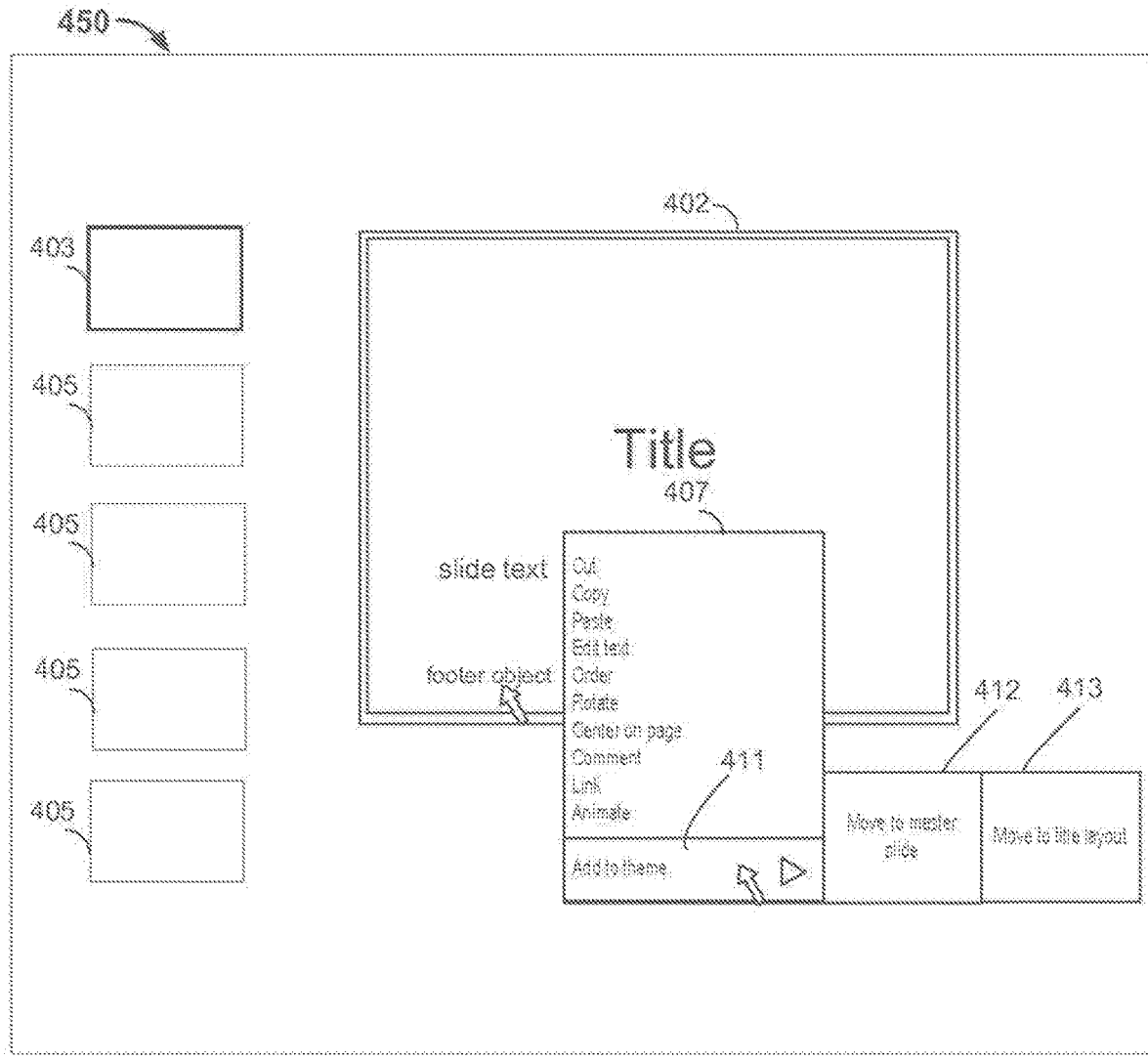

Turning to FIG. 4B, which shows the display 450 which shows a display similar to display 400 with the addition of master options 412 and 413. In display 450, the user is provided with the option to use their recent edit to update one or more master elements. For example a flyout menu button 411 may be selected from a context menu to which provides options to update a master slide 412 or a tit le layout 413 with a recent edit. Other layouts, templates, or elements could also be provided as an option to update. Options 412 and 413 can be used when the edit to the presentation is not necessarily linked to a single master element, giving the user the choice of which master element to update. For example, if a user makes a change to a footer object of a regular slide, the user can decide whether to update that edit to a master slide or a title slide, or some other slide using the context menu. The change would then be updated to the master element and inherited to any dependent slides or dependent elements. In another example, a user may change a title of a presentation to an abbreviated title that the user wishes to use for only a master slide but not a title layout.

Figure 5:
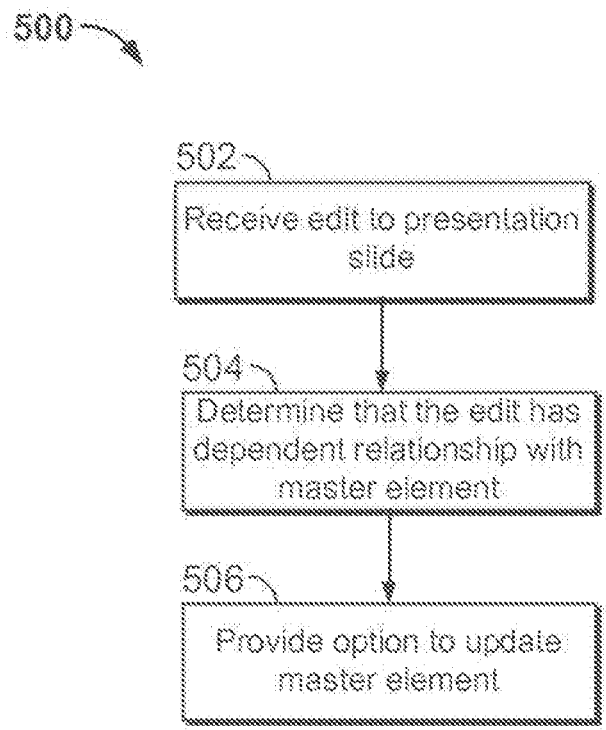
FIGS. 5-6 show methods for presenting a preview of a dependent slide in a presentation in accordance with an implementation as described herein.

Methods are now described for updating a master element or master slide of a presentation. FIG. 5 depicts a method 500 for updating a master. The method includes receiving an edit to a presentation slide, determining that the edit has a dependent relationship with a master element, and providing an option to update the master element. When the user edits a presentation slide in a typical editing mode, the edit is received by the server at 502. The server 200 may determine that the edit was made to a portion of the slide that has a dependent relationship with a master element of the presentation at 504. The server 200 may make the determination, for example, by consulting an index of presentation elements for the presentation file in data store 210 to identify any master templates, layouts, slides or other elements and matching it to a location of the edit. If a relationship between the edit and a master element is determined, then an option is provided to the user to update the master element at 506. The option for updating the master element may be made, for example, using a context menu in a regular editing screen display.

Figure 6:
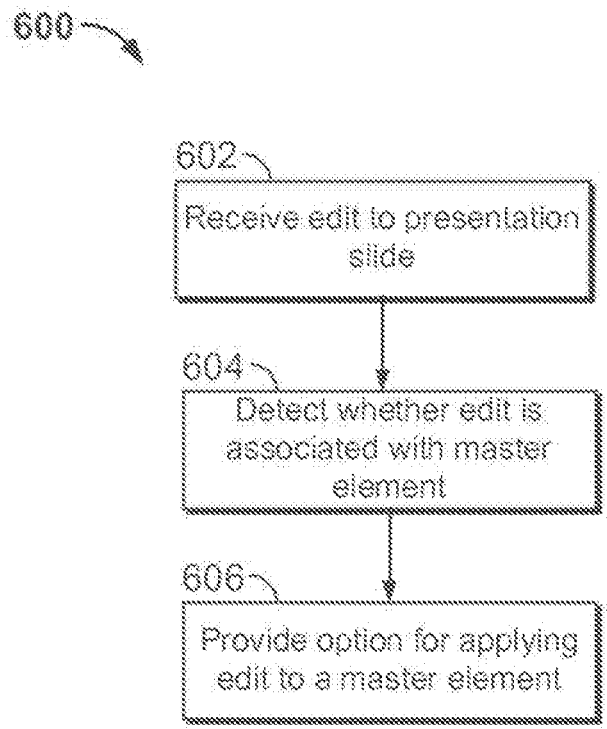

In another implementation, a master element can be updated by making changes to a regular slide in a presentation even if a relationship with a master element does not exist. Turning to FIG. 6, method 600 includes receiving an edit to a presentation slide, detecting whether the edit is associated with a master element in the presentation, and providing an option for applying the edit in the presentation. When the user makes an edit to a presentation slide it is received by server 200 at 602. The server 200 may analyze the edit and determine whether it is associated with a slide element that has a master element at 604. The server 200 may also detect that there is no association between the edit and one or more master elements (or example, a master slide, template or other master element) in the presentation. The detection of master elements and associations with an edit can occur by querying an index for the presentation file. If a master element exists in the presentation file, the server 200 may supply options apply the edit to the presentation at 606. If there is an association between the edit and one or more master elements, options for updating a related master element may be provided. If no relationship or association exists between the edit and one or more detected master elements, the server 200 may supply options to update the detected one or more master elements that the user can select, for example, using a context menu. Using this technique, the user can apply edits to unrelated master elements in a presentation. The options for applying the edit can be provided via a menu in the editing display screen, for example a context menu providing options for updating one or more master elements in the presentation. If the user selects an element to update, the master element will be updated causing any dependent elements to also be updated.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for updating a theme element of a presentation comprising a master slide and one or more non-master slides, the method comprising:
   causing, by a processing device, display of a user interface on a client computer of a user, the user interface comprising a first non-master slide of the one or more non-master slides of the presentation and a first option to edit an element of the first non-master slide;
   receiving, by the processing device, a user selection of the first option to edit the element of the first non-master slide, wherein the user selection of the first option comprises a request to modify the element of the first non-master slide;
   causing the element of the first non-master slide to be modified based on the user selection of the first option;
   receiving, by the processing device, a user selection of a second option in the user interface to apply the modification to the element of the first non-master slide to a theme of the presentation;
   in response to receiving the user selection of the second option to apply the modification to the element of the first non-master slide to the theme of the presentation, causing the theme element corresponding to the element of the first non-master slide to be updated based on the modification of the element of the first non-master slide; and causing the modification of the element of the first non-master slide to be automatically propagated to elements of other slides of the presentation that are associated with the theme.

2. The method of claim 1, wherein at least one of the first option or the second option is an entry in a context menu displayed in the user interface.

3. The method of claim 1, wherein the theme element is a master element.

4. The method of claim 3, wherein the master element provides for at least one of a certain format applied to one or more elements of the presentation, a certain font type of one or more elements of the presentation, or a certain size of one or more elements of the presentation.

5. The method of claim 3, further comprising receiving, by the processing device, a user selection of one or more dependencies associated with the master element.

6. The method of claim 1, further comprising presenting, in the user interface, a third option and a fourth option, wherein the third option allows a user to request update of a first master element of the presentation based on the modification of the element of the first non-master slide, and the fourth option allows the user to request update of a second master element of the presentation based on the modification of the element of the first non-master slide.

7. The method of claim 1, wherein the modification of the element of the first non-master slide is not associated with the theme or a master element.

8. The method of claim 1, further comprising:
   determining that the element of the first non-master slide to be modified based on the user selection of the first option has a dependent relationship with a master element of the presentation; and
   presenting, in the user interface, a third option to apply the modification to the element of the first non-master slide to the master element of the presentation.

9. A system to update a theme element of a presentation comprising a master slide and one or more non-master slides, the system comprising:
   a memory; and
   a processor, coupled to the memory, to perform operations comprising:
   causing display of a user interface on a client computer of a user, the user interface comprising a first non-master slide of the one or more non-master slides of the presentation and a first option to edit an element of the first non-master slide;
   receiving a user selection of the first option to edit the element of the first non-master slide, wherein the user selection of the first option comprises a request to modify the element of the first non-master slide;
   causing the element of the first non-master slide to be modified based on the user selection of the first option;
   receiving a user selection of a second option in the user interface to apply the modification to the element of the first non-master slide to a theme of the presentation;
   in response to receiving the user selection of the second option to apply the modification to the element of the first non-master slide to the theme of the presentation, causing the theme element corresponding to the element of the first non-master slide to be updated based on the modification of the element of the first non-master slide; and
   causing the modification of the element of the first non-master slide to be automatically propagated to elements of other slides of the presentation that are associated with the theme.

10. The system of claim 9, wherein at least one of the first option or the second option is an entry in a context menu displayed in the user interface.

11. The system of claim 9, wherein the theme element is a master element.

12. The system of claim 11, wherein the master element provides for at least one of a certain format applied to one or more elements of the presentation, a certain font type of one or more elements of the presentation, or a certain size of one or more elements of the presentation.

13. The system of claim 11, the operations further comprising receiving, by the processor, a user selection of one or more dependencies associated with the master element.

14. The system of claim 9, the operations further comprising presenting, in the user interface, a third option and a fourth option, wherein the third option allows a user to request update of a first master element of the presentation based on the modification of the element of the first non-master slide, and the fourth option allows the user to request update of a second master element of the presentation based on the modification of the element of the first non-master slide.

15. The system of claim 9, wherein the modification of the element of the first non-master slide is not associated with the theme or a master element.

16. The system of claim 9, the operations further comprising:
   determining that the element of the first non-master slide to be modified based on the user selection of the first option has a dependent relationship with a master element of the presentation; and
   presenting, in the user interface, a third option to apply the modification to the element of the first non-master slide to the master element of the presentation.

17. A non-transitory machine-readable storage medium with instructions stored therein, which when executed by a processing device, cause the processing device to perform operations to update a theme element of a presentation comprising a master slide and one or more non-master slides, the operations comprising:
   causing display of a user interface on a client computer of a user, the user interface comprising a first non-master slide of the one or more non-master slides of the presentation and a first option to edit an element of the first non-master slide;
   receiving a user selection of the first option to edit the element of the first non-master slide, wherein the user selection of the first option comprises a request to modify the element of the first non-master slide;
   causing the element of the first non-master slide to be modified based on the user selection of the first option;
   receiving a user selection of a second option in the user interface to apply the modification to the element of the first non-master slide to a theme of the presentation;
   in response to receiving the user selection of the second option to apply the modification to the element of the first non-master slide to the theme of the presentation, causing the theme element corresponding to the element of the first non-master slide to be updated based on the modification of the element of the first non-master slide; and causing the modification of the element of the first non-master slide to be automatically propagated to elements of other slides of the presentation that are associated with the theme.

18. The non-transitory machine-readable storage medium of claim 17, wherein at least one of the first option or the second option is an entry in a context menu displayed in the user interface.

19. The non-transitory machine-readable storage medium of claim 17, wherein the theme element is a master element that provides for at least one of a certain format applied to one or more elements of the presentation, a certain font type of one or more elements of the presentation, or a certain size of one or more elements of the presentation.

20. The non-transitory machine-readable storage medium of claim 17, the operations further comprising presenting, in the user interface, a third option and a fourth option, wherein the third option allows a user to request update of a first master element of the presentation based on the modification of the element of the first non-master slide, and the fourth option allows the user to request update of a second master element of the presentation based on the modification of the element of the first non-master slide.

21. The non-transitory machine-readable storage medium of claim 17, the operations further comprising:
   determining that the element of the first non-master slide to be modified based on the user selection of the first option has a dependent relationship with the master element of the presentation; and
   presenting, in the user interface, a third option to apply the modification to the element of the first non-master slide to the master element of the presentation.

\* \* \* \* \*